US009720426B2

(12) United States Patent
Xie

(10) Patent No.: US 9,720,426 B2
(45) Date of Patent: Aug. 1, 2017

(54) SINGLE-HANDLE DUAL-CONTROL THERMOSTATIC VALVE AND SINGLE-HANDLE DUAL-CONTROL THERMOSTATIC FAUCET

(71) Applicant: Suprema (Zhuhai J/V) Thermostatic Sanitaryware Co., Ltd., Zhuhai (CN)

(72) Inventor: Qingjun Xie, Zhuhai (CN)

(73) Assignee: SUPREMA (ZHUHAI J/V) THERMOSTATIC SANITARYWARE CO., LTD., Zhuhai (CN)

( * ) Notice: Subject to any disclaimer, the term of this patent is extended or adjusted under 35 U.S.C. 154(b) by 343 days.

(21) Appl. No.: 14/597,401

(22) Filed: Jan. 15, 2015

(65) Prior Publication Data

US 2016/0048140 A1    Feb. 18, 2016

(30) Foreign Application Priority Data

Aug. 15, 2014 (CN) ...................... 2014 2 0464057 U
Aug. 20, 2014 (CN) ...................... 2014 2 0471783 U
Dec. 19, 2014 (CN) ...................... 2014 2 0820043 U

(51) Int. Cl.
*G05D 23/13* (2006.01)
*F16K 11/078* (2006.01)

(52) U.S. Cl.
CPC ...... *G05D 23/1353* (2013.01); *F16K 11/0787* (2013.01)

(58) Field of Classification Search
CPC .... G05D 23/13; G05D 23/132; G05D 23/134; G05D 23/1346; G05D 23/1353; F16K 11/0787

(Continued)

(56) References Cited

U.S. PATENT DOCUMENTS 4,640,457 A * 2/1987 MacDonald ....... G05D 23/1353
137/100
4,941,506 A * 7/1990 Bergmann .......... F16K 11/0787
137/625.17

(Continued)

*Primary Examiner* — Marc Norman
(74) *Attorney, Agent, or Firm* — The PL Law Group, PLLC

(57) ABSTRACT

For the single-handle dual-control thermostatic valve and the faucet, a hot water incoming channel, a hot water outgoing channel, a cold water incoming channel and a cold water outgoing channel are provided in the valve core body respectively. A static ceramic chip is provided above the valve core body in the valve jacket, a dynamic ceramic chip is provided on the static ceramic chip. On the static ceramic chip, a hot water inlet passage, a hot water outlet passage a cold water inlet passage and a cold water outlet passage are provided separately, the hot water inlet passage, the hot water outlet passage, the cold water inlet passage and the cold water outlet passage are connected correspondingly with the hot water incoming channel, the hot water outgoing channel, the cold water incoming channel and the cold water outgoing channel of the valve core body respectively. On the dynamic ceramic chip, a hot water controlling channel and a cold water controlling channel are provided. The hot water controlling channel can open or shut off both the hot water inlet passage and the hot water outlet passage on the static ceramic chip, and the cold water controlling channel can open or shut off both the cold water inlet passage and the cold water outlet passage on the static ceramic chip. The dynamic ceramic chip in the present invention does not change the flow of hot water and cold water into the regulator during its rotation, the hot incoming water and the cold incoming water can be opened or shut off by the sliding dynamic ceramic chip so as to regulate the water flow.

13 Claims, 13 Drawing Sheets

(58) Field of Classification Search
USPC .......................................... 236/12.11, 12.16
See application file for complete search history.

(56) References Cited

U.S. PATENT DOCUMENTS

| | | | |
|---|---|---|---|
| 5,340,018 A * | 8/1994 | MacDonald | G05D 23/1353 236/12.2 |
| 6,263,899 B1 * | 7/2001 | Zindler | G05D 23/1313 137/98 |
| 2016/0076660 A1 * | 3/2016 | DiNunzio | F16K 11/078 137/1 |

* cited by examiner

SINGLE-HANDLE DUAL-CONTROL THERMOSTATIC VALVE AND SINGLE-HANDLE DUAL-CONTROL THERMOSTATIC FAUCET

BACKGROUND

Technical Field

The present invention relates to the technical field of plumbing equipment, and, especially to the thermostatic valve used in a thermostatic faucet and the single-handle dual-control thermostatic faucet.

Background Art

The thermostatic faucet is popular among the consumers due to its convenience in water temperature regulation and has been widely applied in various types of bathwater supply systems of various occasions. Constant temperature mainly means that a user can self-regulate the water outlet temperature according to his/her needs and the mixed water from outlet can keep a constant temperature upon setting. The advantage of the thermostatic faucet is that, it is safe and burn-proof, the tremendous change in the outgoing water temperature can be avoided, which is caused by the change in water incoming pressure or the instable water incoming temperature occurred in the ordinary valve core.

As a key part of the thermostatic faucet, the thermostatic valve's function and structure determine directly those of the thermostatic faucet and further the user's experience, including the convenience in use and completeness in function. For the single-handle thermostatic faucet available now, by operating its single handle, only the water outgoing temperature can be set and the water outlet's switching on/off can be controlled, and the water outgoing flow can not be regulated freely and the user's higher expectation in use can not be met accordingly.

SUMMARY

The present invention is designed to provide a single-handle dual-control thermostatic valve with optimized structure of the valve core body and increased flow in the valve body and a single-handle dual-control thermostatic faucet in which the thermostatic valve is provided.

For that purpose, the following technical solution is adopted in the present invention:

A single-handle dual-control thermostatic valve comprises a valve core body, a valve jacket hermetically-connected with the upper part of the valve core body; and a valve seat located at the bottom of the valve core body, wherein the valve core body and the valve seat forms a space for accommodating a temperature regulating part and a water mixing zone; a flow part and a control part is provided in the valve jacket, while the upper end of the driving lever of the control part extends upwards out of the valve jacket; a hot water incoming channel, a cold water incoming channel, a hot water outgoing channel and a cold water outgoing channel are provided separately in the valve core body, and the hot water incoming channel and the cold water incoming channel penetrates through the valve core body; the valve core body has a hot water inlet which connects with the hot water outgoing channel and the water mixing zone and a cold water inlet which connects with the cold water outgoing channel and the water mixing zone, and the hot water inlet and the cold water inlet are located at the positions with different heights in the valve core body; a static ceramic chip having a hot water inlet passage, a hot water outlet passage a cold water inlet passage and a cold water outlet passage is provided above the valve core body in the valve jacket, a dynamic ceramic chip having a hot water controlling channel and a cold water controlling channel is provided on the static ceramic chip, the dynamic ceramic chip is connected with the control part and can rotate and translate by the control part, wherein the hot water inlet passage, the hot water outlet passage, the cold water inlet passage and the cold water outlet passage are connected correspondingly with the hot water incoming channel, the hot water outgoing channel, the cold water incoming channel and the cold water outgoing channel of the valve core body respectively, the hot water controlling channel can open or shut off both the hot water inlet passage and the hot water outlet passage on the static ceramic chip, and the cold water controlling channel can open or shut off both the cold water inlet passage and the cold water outlet passage on the static ceramic chip; a mixed water outlet is located on the valve seat and connected with the water mixing zone.

More specific technical solution for the single-handle dual-control thermostatic valve in the present invention is as follows:

the temperature regulating part comprises a temperature regulating valve stem, a temperature regulating valve stem seat, a thermo-sensitive element, a regulator and a return spring, wherein a hole for the temperature regulating valve stem is provided at the top of the valve core body and the temperature regulating valve stem seat is fixed to the internal wall of the temperature regulating valve stem hole, the temperature regulating valve stem thread-fits with the temperature regulating valve stem seat and its upper end extends upwards; the regulator including a water control portion and a supporting portion is provided between the temperature regulating stem seat and the valve seat, and the external peripheral wall of the water control portion is against the internal wall of the valve core body and the supporting portion is against the bottom of the temperature-regulating valve stem seat, the upper end and lower end of the water control portion are located at the hot water inlet and the cold water inlet of the valve core body respectively; a cold/hot isolation seal ring between the hot water inlet and the cold water inlet is provided on the external peripheral wall of the water control portion, the upper end of the thermo-sensitive element is indirectly against the valve stem by a locking spring and its lower end is indirectly against the valve seat by a return spring, the lower end and upper end of the return spring is against the valve seat and the regulator respectively.

More specific technical solution for the single-handle dual-control thermostatic valve in the present invention is as follows:

the control part comprises a driving lever, a driving lever seat, a drive plate and the drive plate's driver, the driving lever seat and the drive plate are accommodated on the upper part of the internal cavity in the valve jacket, and the drive plate is located below the driving lever seat and connected with the dynamic ceramic chip, the outer teeth at the upper end of the temperature regulating valve stem fits with the inner teeth in the center hole of the driving lever seat, the lower part of the driving lever penetrates through the driving lever seat and is connected with the lever seat by a dowel, the lower end of the driving lever is embedded into and fixed to the driving lever driver on the drive plate.

More specific technical solution for the single-handle dual-control thermostatic valve in the present invention is as follows:

the hot water inlet passage of the static ceramic chip is located outside of the hot water outlet passage and is longer than the latter; the cold water inlet passage is located outside of the cold water outlet passage and is longer than the latter.

More specific technical solution for the single-handle dual-control thermostatic valve in the present invention is as follows:

the water incoming end face of the hot water incoming channel and that of the cold water incoming channel are located on the bottom surface of the valve core body and are arc-shaped, the water outgoing end face of the hot water incoming channel, that of the cold water incoming channel, the water incoming end face of the hot water outgoing channel and that of the cold water outgoing channel are located on the top surface of the valve core body and are sector-shaped; and the water outgoing end face of the hot water incoming channel, that of the cold water incoming channel, the water incoming end face of the hot water outgoing channel and that of the cold water outgoing channel are identical in shape and size and evenly distributed along the circumference with a certain interval.

More specific technical solution for the single-handle dual-control thermostatic valve in the present invention is, the water outgoing end face of the hot water incoming channel deflects 10-30° relatively to axis X.

More specific technical solution for the single-handle dual-control thermostatic valve in the present invention is, the included angle between the edge of the hot water outgoing channel and the axis X is 5-15° and that between the edge of the cold water outgoing channel and the axis X is 40-50°.

More specific technical solution for the single-handle dual-control thermostatic valve in the present invention is: the thermo-sensitive element is connected with the regulator to drive the latter move, a seal ring is provided between the upper end face of the water control portion of the regulator and the internal wall of the valve core body and between the lower end face of the water control portion and the upper end face of the valve seat, when the upper end face of the water control portion contacts with the internal wall of the valve core body, the seal ring closes the gap between the upper end face of the water control portion and the internal wall of the valve core body; when the lower end face of the water control portion contacts with the upper end face of the valve seat, the seal ring closes the gap between the lower end face of the water control portion and the upper end face of the valve seat.

More specific technical solution for the single-handle dual-control thermostatic valve in the present invention is: the seal ring is disposed on the upper end face and the lower end face of the water control portion.

A single-handle dual-control faucet provided with the above-the single-handle dual-control thermostatic valve comprises a faucet shell, a thermostatic valve provided in the faucet shell, a handle which controls the thermostatic valve, a cold water incoming pipe, a hot water incoming pipe and a mixed water outgoing pipe which are connected with the faucet shell, the handle is connected with the driving lever of the thermostatic valve.

More specific technical solution for the single-handle dual-control thermostatic faucet in the present invention is: the cold water incoming pipe and the hot water incoming pipe form an internal control cavity respectively, inside the control cavity, the following are provided: a hollow guiding part which is connected with the water inlet of the control cavity; a piston part provided between the guiding part and the water outgoing end of the control cavity; the internal cavity of the piston part is connected with the internal cavity of the guiding part, and the piston part having a water drawing portion, an elastomer action portion and the contact portion which are connected with one another successively can move axially inside the control cavity, wherein the water drawing portion is embedded into and connected with the guiding part, the contact portion is against the water outlet of the control cavity and a seal ring is provided between the outer edge of the elastomer action portion and the internal wall of the control cavity, a displacement elastomer provided between the elastomer action portion and the guiding part; a sealing pad provided on its installing portion can change the water route between the guiding part and the piston part.

More specific technical solution for the single-handle dual-control thermostatic faucet in the present invention is: the sealing pad installing portion is a support for the sealing pad provided in the connecting portion of the water incoming pipe, and the sealing pad support comprises a water discharge portion having water discharge holes on its peripheral wall connected with the water inlet of the control cavity and a supporting portion provided on the water discharge portion, and the sealing pad is provided on the end face of the supporting portion; and the water drawing portion extends into the internal cavity of the guiding part, and the sealing pad is located at the water incoming side of the water drawing portion.

More specific technical solution for the single-handle dual-control thermostatic faucet in the present invention is: the upper end of the guiding part extends into the water drawing portion of the piston part, the installing portion for the sealing pad is provided inside the contact portion, and the sealing pad is provided on the bottom surface of the installing portion of the sealing pad and is located at the water outgoing side of the guiding part.

It is learnt from the above-the technical proposals that a hot water incoming channel, a cold water incoming channel, a hot water outgoing channel and a cold water outgoing channel are provided on the valve core body, that is, a quartered-water route structure is adopted in the present invention, so that the water discharge area of incoming water and outgoing water can be increased, and the flow of the valve core can also be increased accordingly. On the static ceramic chip, a hot water inlet passage, a hot water outlet passage, a cold water inlet passage and a cold water outlet passage are provided respectively, and on the dynamic ceramic chip, a hot water controlling channel and a cold water controlling channel are provided for opening or shutting off both the water incoming channel and the water outgoing channel. After entering into the ceramic chip through the water incoming channel of the valve core body, the hot water and the cold water flow into the regulator through the ceramic chip and the water outgoing channel of the valve core body and are mixed in the water mixing zone, then the mixed water flows out of the mixed water outlet in the seat. The dynamic ceramic chip in the present invention does not change the flow of hot water and cold water into the regulator when it is rotating, and temperature is regulated by the regulator, which is driven by the thermostatic valve stem (driven by the driving lever seat). The different sliding positions of the dynamic ceramic chip can shut off or open the hot incoming water and the cold incoming water, while flow can be regulated at different positions to which the dynamic ceramic chip slides.

The specific embodiments in the present invention are described in details as follows with reference to the attached drawings.

DETAILED DESCRIPTION

The First Embodiment

Figure 1:
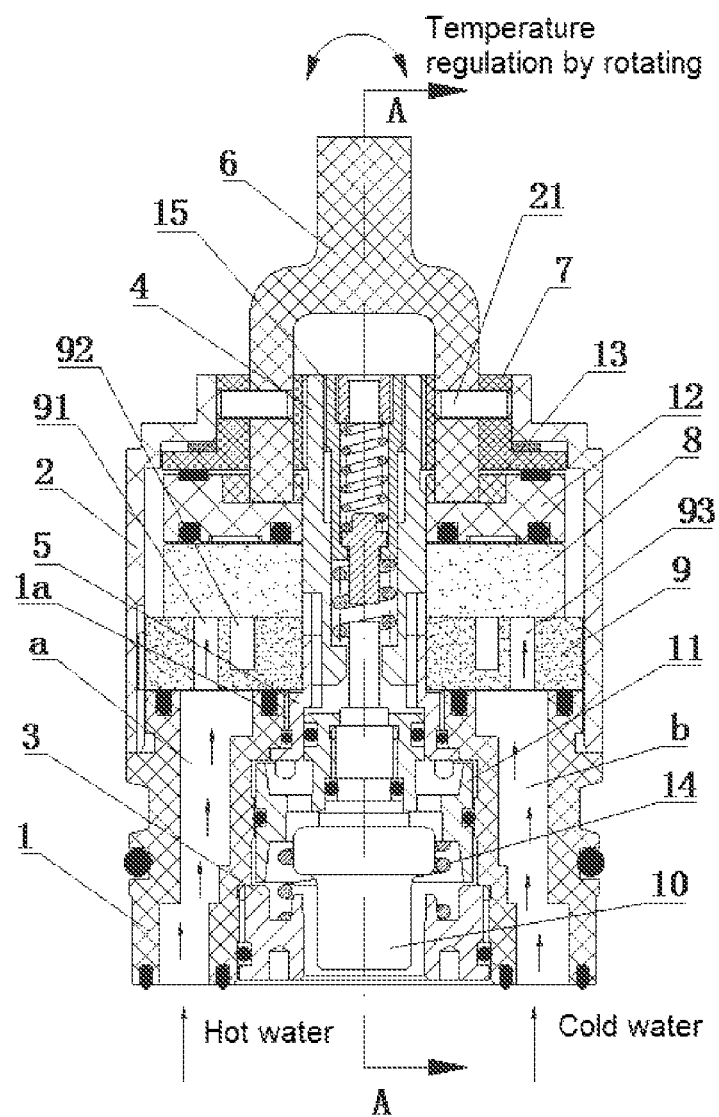
FIG. 1 is a structural schematic drawing of the first embodiment in the present invention.
Figure 2:
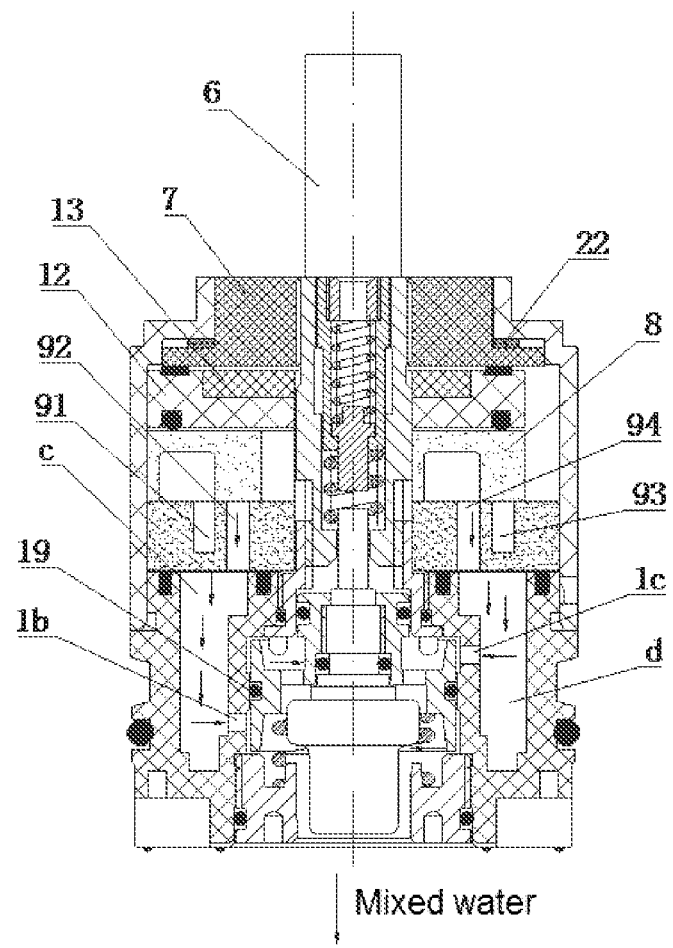
FIG. 2 is a sectional view along line A-A in FIG. 1.
Figure 3:
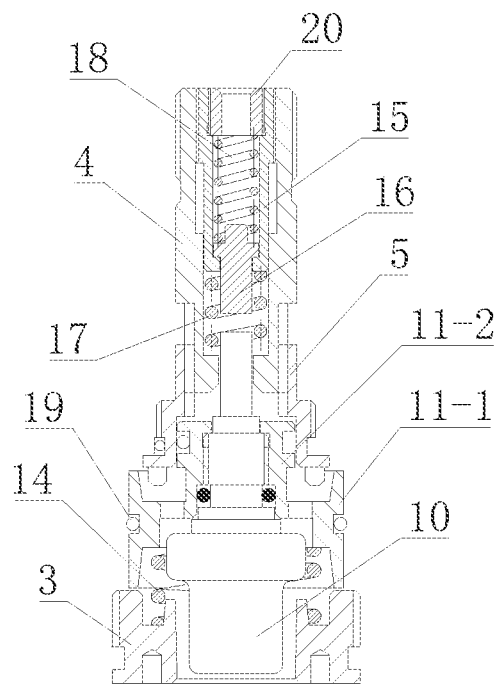
FIG. 3 is a structural schematic drawing of the temperature regulation part in the first embodiment in the present invention.

As is shown in FIG. 1 and FIG. 2, the single-handle dual-control thermostatic valve in this embodiment comprises a thermostatic valve core, a valve jacket, a flow part and a control part, wherein the thermostatic valve core comprises a valve core body 1, a valve seat 3 and a temperature regulating part. The valve jacket 2 fits hermetically by a seal ring with the upper part of the valve core body 1, the valve seat 3 is provided inside the bottom of the valve core body 1, and both the valve core body 1 and the valve seat 3 form an area for accommodating the temperature regulating part and a water mixing zone. With reference to FIG. 3, the temperature regulating part comprises a temperature regulating valve stem 4, a temperature regulating valve stem seat 5, a thermo-sensitive element 10, a regulator 11 and a return spring 14. As a preferred embodiment for the present invention, the temperature regulating part further includes a trim lever 15, an ejector pin 16, a locking spring 17, a buffering spring 18, a cold/hot water isolation seal ring 19 and a top cap 20.

A regulating valve stem hole 1a is drilled on the top of the valve core body 1. The temperature regulating valve stem seat 5 is fixed to the internal wall of the temperature regulating valve stem hole 1a, and the temperature regulating valve stem 4 thread-fits with the temperature regulating valve stem seat 5 and its upper end extends upwards. A hot water incoming channel a, a cold water incoming channel b, a hot water outgoing channel c and a cold water outgoing channel d are provided on the valve core body 1 respectively. Furthermore, an axial hole is drilled inside the temperature regulating valve stem 4, and the trim lever 15 is disposed inside the axial hole in the temperature regulating valve stem 4 and thread-fits with the internal wall of the axial hole. An axial hole is drilled inside the trim lever 15, the top cap 20 is screwed on the top of the axial hole inside the trim lever 15. The upper end of the ejector pin 16 is provided in the axial hole inside the trim lever 15, and a buffering spring 18 is provided between the top cap 20 and the ejector pin 16 and the lower end of the ejector pin 16 extends downwards out of the trim lever 15. A locking spring 17 is provided between the trim lever 15 and the bottom inside the temperature regulating valve stem 4. A regulator 11 is provided between the temperature regulating valve stem seat 5 and the valve seat 3, including a water control portion 11-1 and a supporting portion 11-2. The external peripheral wall of the water control portion 11-1 is against the internal wall of the valve core body 1, and the supporting portion 11-2 is against the bottom of the temperature regulating valve stem seat 5. The upper end and the lower end of the water control portion 11-1 are located respectively at both the hot water inlet 1b and the cold water inlet 1c in the valve core body 1. The hot water inlet 1b and the cold water inlet 1c are located at different heights of the valve core body 1. When the regulator 11 moves upwards or downwards, the opening degree of the hot water inlet 1b and the cold water inlet 1c can be controlled. A hot/cold water isolation seal ring 19 is provided on the external peripheral wall of the water control portion 11-1 and is located between the hot water inlet 1b and the cold water inlet 1c. The upper end of the thermo-sensitive element 10 is indirectly against the ejector pin 16 by the locking spring 17 and its lower end is indirectly against the valve seat 3 by the return spring 14. The lower end of the return spring 14 is against the valve seat 3 and its upper end is against the regulator 11 to push the regulator 11 downwards when upward acting force by the push rod of the thermo-sensitive element 10 becomes smaller.

An assembly internal cavity is provided inside the valve jacket 2, and a driving lever seat 7, a dynamic ceramic chip 8, a static ceramic chip 9 and a drive plate 12 are provided respectively inside the assembly internal cavity of the valve jacket 2. The flow part in the present invention comprises a dynamic ceramic chip 8 and a static ceramic chip 9 provided inside the valve jacket 2. The static ceramic chip 9 is disposed above the valve core body 1 and the dynamic ceramic chip 8 is disposed above the static ceramic chip 9. The control part in the present invention comprises a driving lever 6, a driving lever seat 7, a drive plate 12 and a drive plate driver 13, and preferably, a lubrication piece 22 is provided between the driving lever seat 7 and the valve jacket 2.

The driving lever seat 7 and the drive plate 12 are accommodated in the upper part of the internal cavity inside the valve jacket 2. A center hole is drilled in the driving lever seat 7, and the outer teeth at the upper end of the temperature regulating valve stem 4 fit with the inner teeth of the center hole in the driving lever seat 7. The lower part of the driving lever 6 penetrates through the center hole in the driving lever seat 7 and is connected with the driving lever seat 7 by a dowel 21, and the lower end of the driving lever 6 is embedded into the drive plate driver 13 which is fixed to the drive plate 12. The drive plate driver 13 is connected with the drive plate 12, and the driving lever 6 can either swing around the dowel 21 inside the driving lever seat 7, or drive the plate 12 to rotate by the driving lever 7.

When the driving lever 6 swings, the drive plate 12 translates accordingly to drive the dynamic ceramic chip 8 to translate. The drive plate 12 is provided on the dynamic ceramic chip 8 and connected with the driver of the dynamic ceramic chip 8. When the driving lever 6 is moving, the drive plate 12 is driven to drive the dynamic ceramic chip 8 to regulate the flow. When the driving lever 6 is driven, the driving lever seat 7 can rotate to drive the temperature regulating valve stem 4 rotate to regulate the temperature.

For the thermostatic valve in the preferred embodiment, the trim lever 15 inside the temperature regulating valve stem 4 can be regulated to achieve trimming function during the valve core test.

The trim process and the principle are as follows: Rotate the driving lever 31 to 38° C. position in the faucet and stay there during trimming, and then rotate the trim lever 15 by a wrench. Since the trim lever 15 thread-connects with the temperature regulating valve stem 4, the trim lever 15 can slide up and downwards during its rotation to drive the thermo-sensitive element 10 and the regulator 11 jog. The set temperature is aligned during regulation. In which, a locking spring 17 is installed between the temperature regulating valve stem 4 and the trim lever 15 to avoid the temperature change due to the loosened trim lever 15, so as to obtain a simpler trimming mechanism and a easier and quicker operation.

Figure 4:
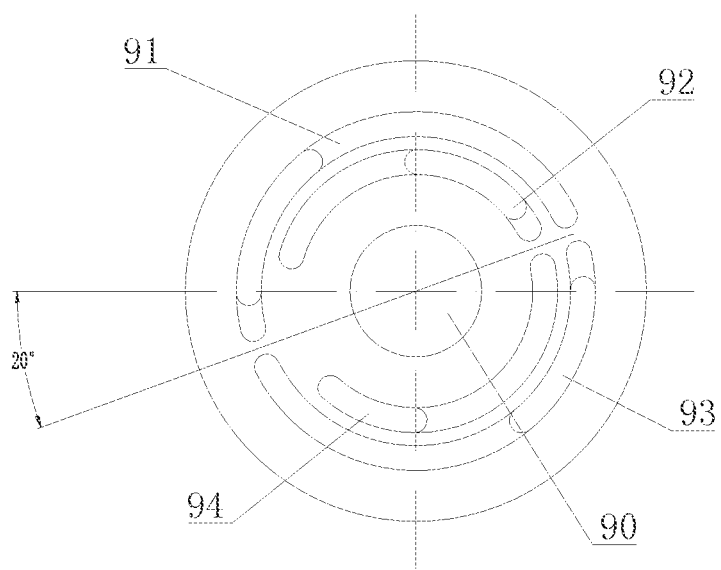
FIG. 4 is a structural schematic drawing of the static ceramic chip in the first embodiment in the present invention.
Figure 5:
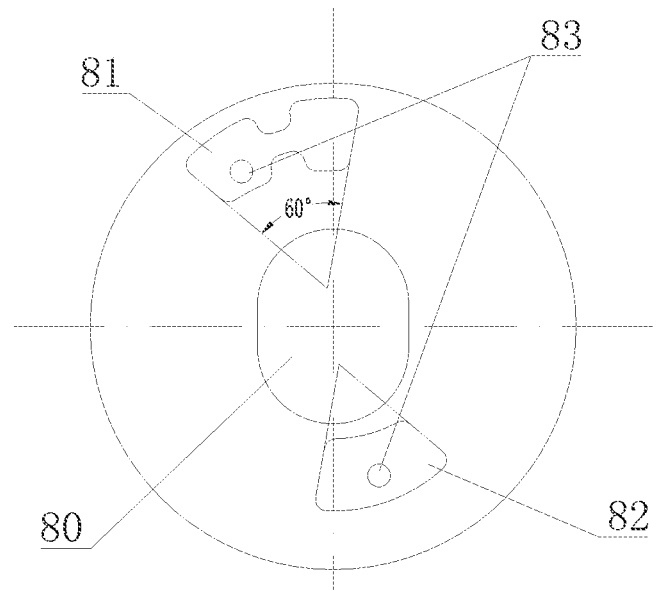
FIG. 5 is a structural schematic drawing of the dynamic ceramic chip in the first embodiment in the present invention.

With reference to FIG. 4 and FIG. 5, a valve stem through-hole 90 is drilled on the static ceramic chip 9, and an arc-shaped hot water inlet passage 91, an arc-shaped hot water outlet passage 92, an arc-shaped cold water inlet passage 93 and an arc-shaped cold water outlet passage 94 are provided outside of the static ceramic chip valve stem through-hole 90. The hot water inlet passage 91 is located outside of the hot water outlet passage 92 and its length (arc length) is longer than that (arc length) of the hot water outlet passage 92, and the cold water inlet passage 93 is located outside of the cold water outlet passage 94 and its arc length is longer than that of the cold water outlet passage 94. As is shown in FIG. 1 and FIG. 2, the hot water inlet passage 91 is connected with the hot water incoming channel a in the valve core body 1, the hot water outlet passage 92 is connected with the hot water outgoing channel c, the cold water inlet passage 93 is connected with the cold water incoming channel b and the cold water outlet passage 94 is connected with cold water outgoing channel d. The dynamic ceramic chip 8 is provided above the static ceramic chip 9, and a dynamic ceramic chip valve stem through-hole 80 is drilled on the dynamic ceramic chip 8. An eccentric hot water controlling channel 81 and an eccentric cold water controlling channel 82 are provided peripherally of the dynamic ceramic chip valve stem through-hole 80 at the bottom surface of the dynamic ceramic chip 8, furthermore, a pressure reduction through-hole 83 is drilled in both the hot water controlling channel 81 and the cold water controlling channel 82. The pressure reduction through-hole 83 provided can decrease the tensile force acting on the ceramic chip by dynamic pressure (water flow) and seal between the dynamic ceramic chip and the static ceramic chip can be enhanced, and meanwhile, the frictional force between the dynamic ceramic chip and the static ceramic chip can be decreased, so that the touch feel during the valve core rotating can be improved.

Figure 6:
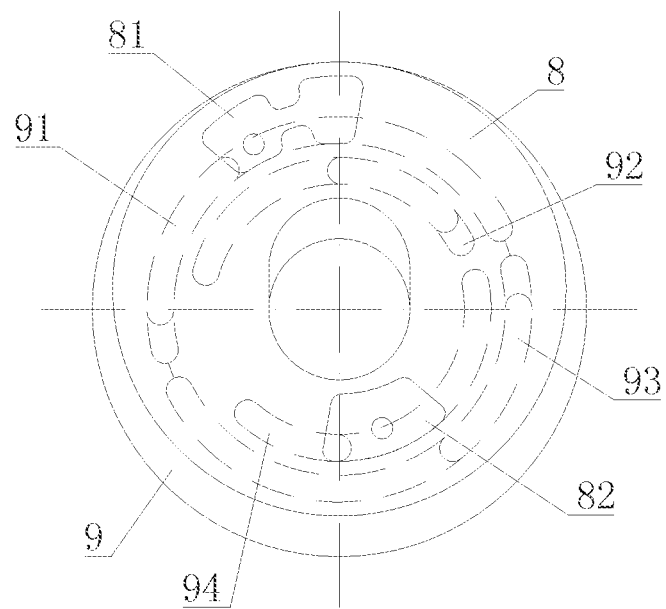
FIG. 6 is a matched schematic drawing of the dynamic ceramic chip and the static ceramic chip when the water is shut off.
Figure 7:
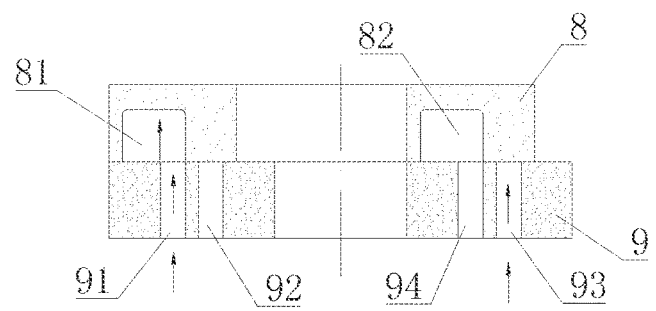
FIG. 7 is a sectional view of FIG. 6.
Figure 8:
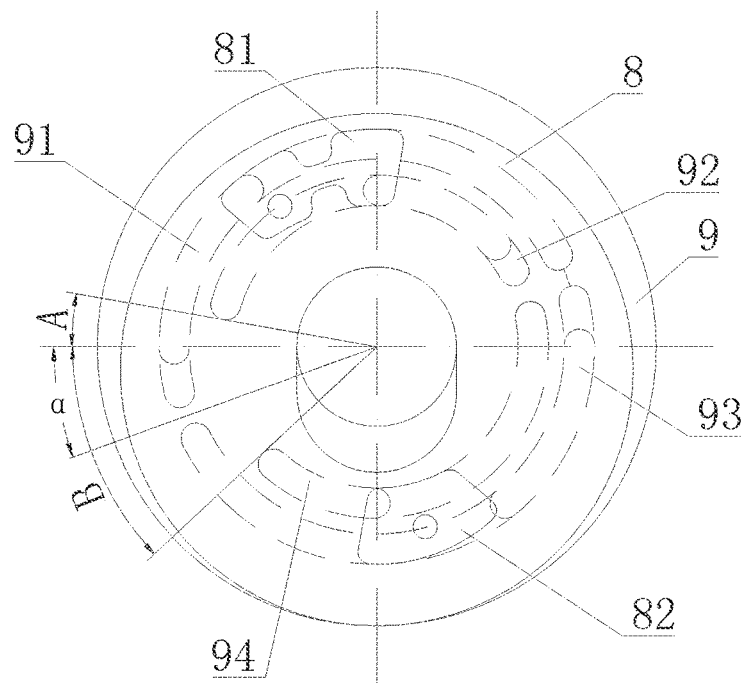
FIG. 8 is a matched schematic drawing of the dynamic ceramic chip and the static ceramic chip when the water channel is open.
Figure 9:
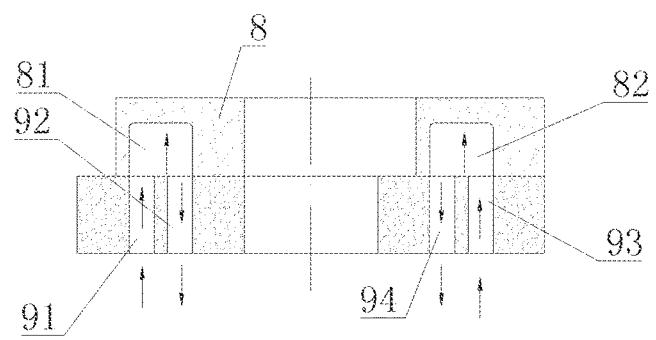
FIG. 9 is a sectional view of FIG. 8.

As is shown in FIG. 6 and FIG. 7, the hot water channel shuts off when the hot water controlling channel 81 provided in the dynamic ceramic chip 8 is staggered from the hot water outlet passage 92 in the static ceramic chip 9, and meanwhile, the cold water channel shuts off when the cold water controlling channel 82 provided in the dynamic ceramic chip 8 is staggered from the cold water inlet passage 93 in the static ceramic chip 9. As is shown in FIG. 8 and FIG. 9, when the dynamic ceramic chip 8 is driven to the open position, the hot water inlet passage 91 in the static ceramic chip 9 is connected by the hot water controlling channel 81 in the dynamic ceramic chip 8 with the hot water outlet passage 92 and then the hot water channel is opened; and meanwhile, the cold water inlet passage 93 in the static ceramic chip 9 is connected by the cold water controlling channel 82 in the dynamic ceramic chip 8 with the cold water outlet passage 94 and then the cold water channel is opened. The hot water and the cold water flow into the mixed water zone respectively through the hot water inlet 1b connected with the hot water outgoing channel c and the cold water inlet 1c connected with the cold water outgoing channel d. When the cold water flows through the upper end of the regulator 11 into the mixed water zone and the hot water flows through the lower end of the regulator 11 into the mixed water zone respectively, the temperature sensing portion of the thermo-sensitive element 10 can sense the temperature change of the mixed water and its push rod will extend or contract accordingly to drive the regulator 11 jog upwards or downwards inside the valve core body 1. By the action of the thermo-sensitive element 10 and the return spring 14, the upper end and lower end of the water control portion 11-1 of the regulator 11 can control the opening degrees of the hot water inlet 1b and the cold water inlet 1c so as to control the dynamic balance between the hot incoming water and the cold incoming water and so that a constant temperature can be maintained (The constant temperature required can be set by rotating the temperature regulating valve stem.)

After flowing respectively into the ceramic chip, the hot water and the cold water flow respectively into the regulator through the hot water inlet 1b and the cold water inlet 1c, and after mixing in the water mixing zone, the mixed water flows out through the mixed water outlet 30 in the valve seat 3. In the present invention, the flow of the cold water and the hot water into the regulator will not be changed during the dynamic ceramic chip rotating. Temperature can be regulated in this way, i.e. the thermostatic valve stem (which drives the regulator for temperature regulating in turn) is driven by the drive lever seat. The cold incoming water and the hot incoming water can be shut off or open by the sliding dynamic ceramic chip to regulate the flow.

Figure 10:
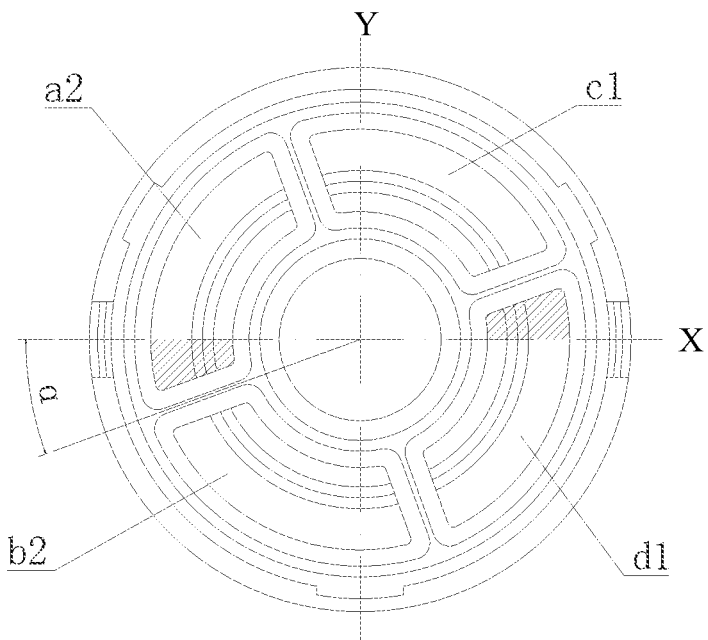
FIG. 10 is a top view of the valve core body in the first embodiment in the present invention.
Figure 11:
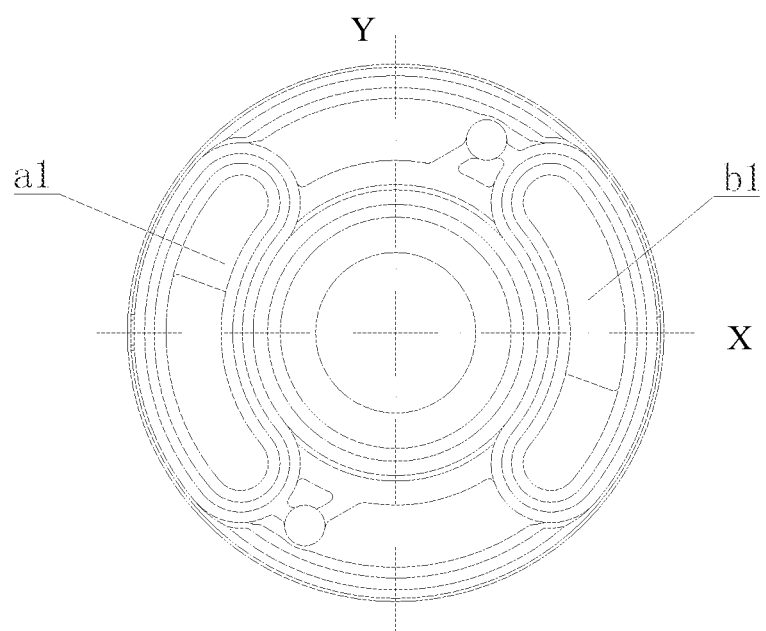
FIG. 11 is a bottom view of the valve core body in the first embodiment in the present invention.

As is shown in FIG. 10 and FIG. 11, the top view and bottom view of the valve core body respectively. The hot water incoming channel and the cold water incoming channel penetrates through the valve core body 1 separately, and the water incoming end face a1 of the hot water incoming channel and the water incoming end face b1 of the cold water incoming channel are located on the bottom surface of the valve core body and are arc-shaped (sector-shaped). The connection line between the midpoints of two arcs is taken as Axis x (the connection line between the geometrical centre lines of two sectors). The water outgoing end face a2 of the hot water incoming channel, the water outgoing end face b2 of the cold water incoming channel, the water incoming end face c1 of the hot water outgoing channel and the water incoming end face dl of the cold water outgoing channel are provided respectively on the top surface of the valve core body and are sector-shaped. The water outgoing end face a2 of the hot water incoming channel, the water outgoing end face b2 of the cold water incoming channel, the water incoming end face c1 of the hot water outgoing channel and the water incoming end face dl of the cold water outgoing channel are identical in shape and equal in size, arranged circumferentially and evenly spaced. The water outgoing end face a2 of the hot water incoming channel deflects an angle α relatively to Axis x, which is between 10-30°. Angle α is considered as 20° in this embodiment. A quartered-water route structure is adopted in the valve core body so that the water discharge area of the incoming water and the outgoing water and also the flow of the valve core can be increased. Since the position of water incoming is fixed (the positions on the water incoming end face a1 and the water incoming end face b1) and the quartered-water route rotates between 10-30°, the workmanship for the water incoming hole of the faucet can be improved and the water discharge area can be increased too. (As is shown in FIG. 11, the shadow part is the increased water discharge area after rotating 20°).

With reference to FIG. 9, when the water outgoing end face a2 of the hot water incoming channel deflects relatively to Axis x, the included angle A between the edge of the hot water outlet passage 92 and Axis x is 10° and the included angle B between the edge of the cold water outlet passage 94 and Axis x is 43°. The angle A can be between 5-15° and B between 40-50° in the present invention. The cold/hot water outlet passage in the static ceramic chip deflects a certain angle along with the quartered-water route in the valve core body, the valve core body can regulate the outgoing water in high or low temperature by regulating the water discharge area of the cold water and the hot water.

Figure 12:
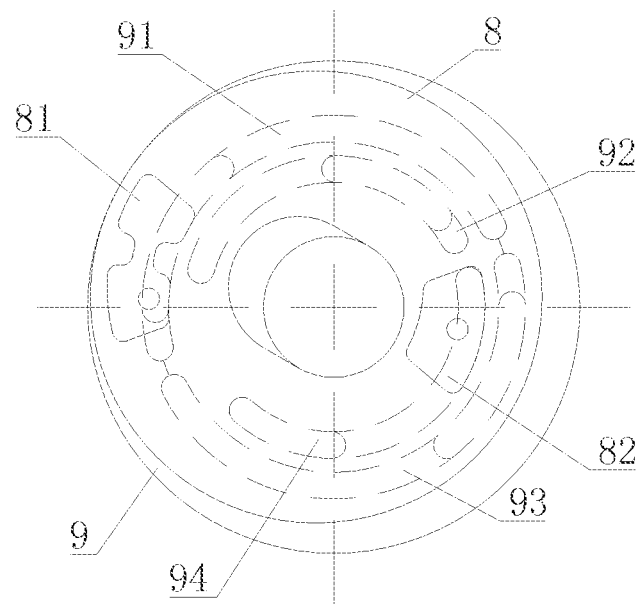
FIG. 12 is a matched schematic drawing of the dynamic ceramic chip and the static ceramic chip when the water channel is shut off and total cold water remained.
Figure 13:
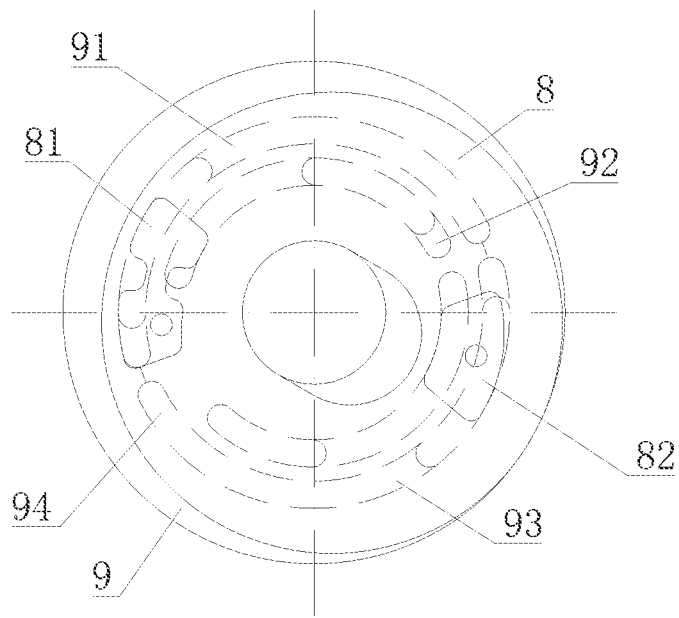
FIG. 13 is a matched schematic drawing of the dynamic ceramic chip and the static ceramic chip when the water channel is shut off and total hot water remained.

As is shown in FIG. 12, it is a status of water shut off and total cold water remained. At this moment, when the hot water controlling channel 81 in the dynamic ceramic chip 8 is staggered from the hot water outlet passage 92 in the static ceramic chip 9, the cold water controlling channel 82 in the dynamic ceramic chip 8 is staggered from the cold water inlet passage 93 in the static ceramic chip 9 so that both the hot water channel and the cold water channel are shut off. With reference to FIG. 13, the dynamic ceramic chip 8 slides to the "on" position by driving the drive lever. The hot water inlet passage 91 in the static ceramic chip 9 is connected with the hot water outlet passage 92 by the hot water controlling channel 81, and the cold water inlet passage 93 in the static ceramic chip 9 is connected with the cold water outlet passage 94 by the cold water controlling channel 82, then both the hot water channel and cold water channel are opened. Since the hot water outlet passage 92 deflects a certain angle, the hot water controlling channel 81 are not opened coincidently with the hot water outlet passage 92 in a status of total cold water remained, thus the discharge area of the hot water is less than that of the cold water and the cold water flow is large, the water outgoing in lowest temperature can be achieved under the condition that the area of discharge area of cold water is biggest.

Figure 14:
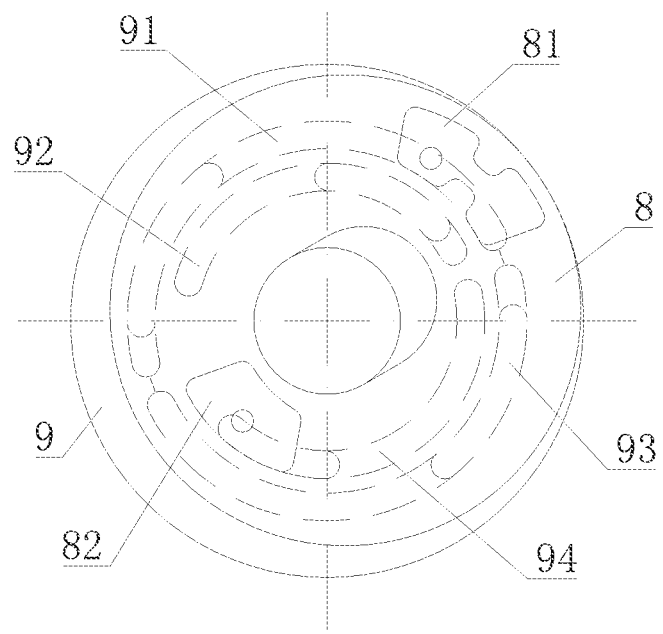
FIG. 14 is a matched schematic drawing of the dynamic ceramic chip and the static ceramic chip when the water channel is open and total cold water remained.
Figure 15:
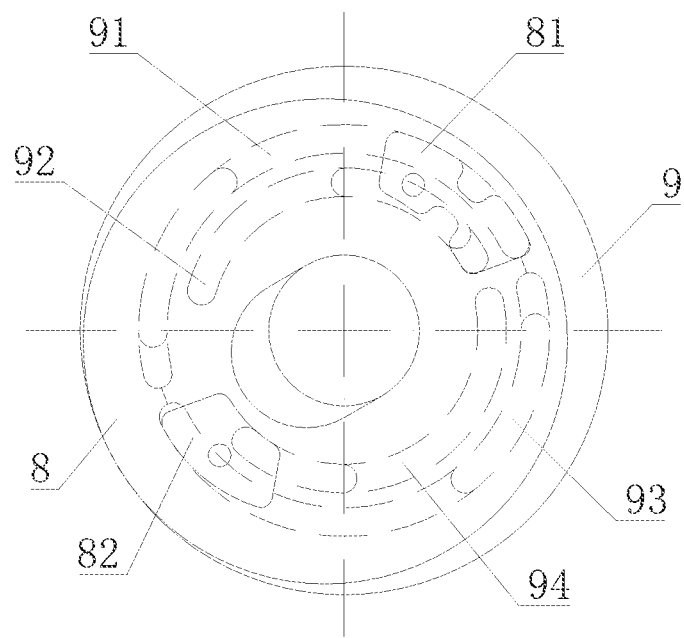
FIG. 15 is a matched schematic drawing of the dynamic ceramic chip and the static ceramic chip when the water channel is open and total hot water remained.

As is shown in FIG. 14, it is a status of water shut off and total hot water remained. At this moment, when the hot water controlling channel 81 in the dynamic ceramic chip 8 is staggered from the hot water outlet passage 92 in the static ceramic chip 9, the cold water controlling channel 82 is staggered from the cold water inlet passage 93 in the static ceramic chip 9 so that both the hot water channel and the cold water channel are shut off. With reference to FIG. 15, the dynamic ceramic chip 8 slides to the "on" position by driving the drive lever. The hot water inlet passage 91 in the static ceramic chip 9 is connected with the hot water outlet passage 92 by the hot water controlling channel 81, and the cold water inlet passage 93 in the static ceramic chip 9 is connected with the cold water outlet passage 94 by the cold water controlling channel 82, then both the hot water channel and cold water channel are opened. Since the cold water outlet passage 94 deflects a certain angle, the cold water controlling channel 82 are not opened coincidently with the cold water outlet passage 94 in a status of total hot water remained, thus the discharge area of cold water is less than that of hot water, the hot water flow is bigger, so that the water outgoing of valve core body in highest temperature is achieved under the condition of biggest discharge area of hot water.

Furthermore, in this embodiment the hot water controlling channel 81 and the cold water controlling channel 82 are sector-shaped and both of the central angle is 60° so that the water flow is guaranteed in a status of the largest water discharge area during the dynamic ceramic chip rotating at the "switching on/off" position. The hot water controlling channel 81 and the cold water controlling channel can be identical in shape and be different also. The hot water controlling channel and the cold water controlling channel with different shapes can be adopted to keep the cold water incoming area equal to the hot water incoming area. Taking this embodiment for example, the distance between the hot water controlling channel and the centre angle is different from that between the cold water controlling channel and the centre angle so that the hot water controlling channel is of an irregular shape, that is, a sector in "H" shape approximately, to keep the cold incoming water area equal to that of the hot incoming water.

Since the extension travel and contraction travel of thermo-sensitive element are caused by the temperature of hot water and cold water, and generally the rotation angle of the valve core of single-handle dual-control thermostatic valve is 120° and the discharge area of the ceramic chip is unchanged both in high or low temperature, in order to change the discharge area both in high or low temperature, travel of thermostatic valve core has to be increased; however, excessive travel will eliminate the self-locking of the thread, resulting into the inability for accurate temperature-regulating. In this embodiment, the water discharge area of hot/cold water is changed due to the position of high/low temperature of the static ceramic chip so that both low/high temperate can be regulated by the valve core with a certain travel.

The Second Embodiment

Figure 16:
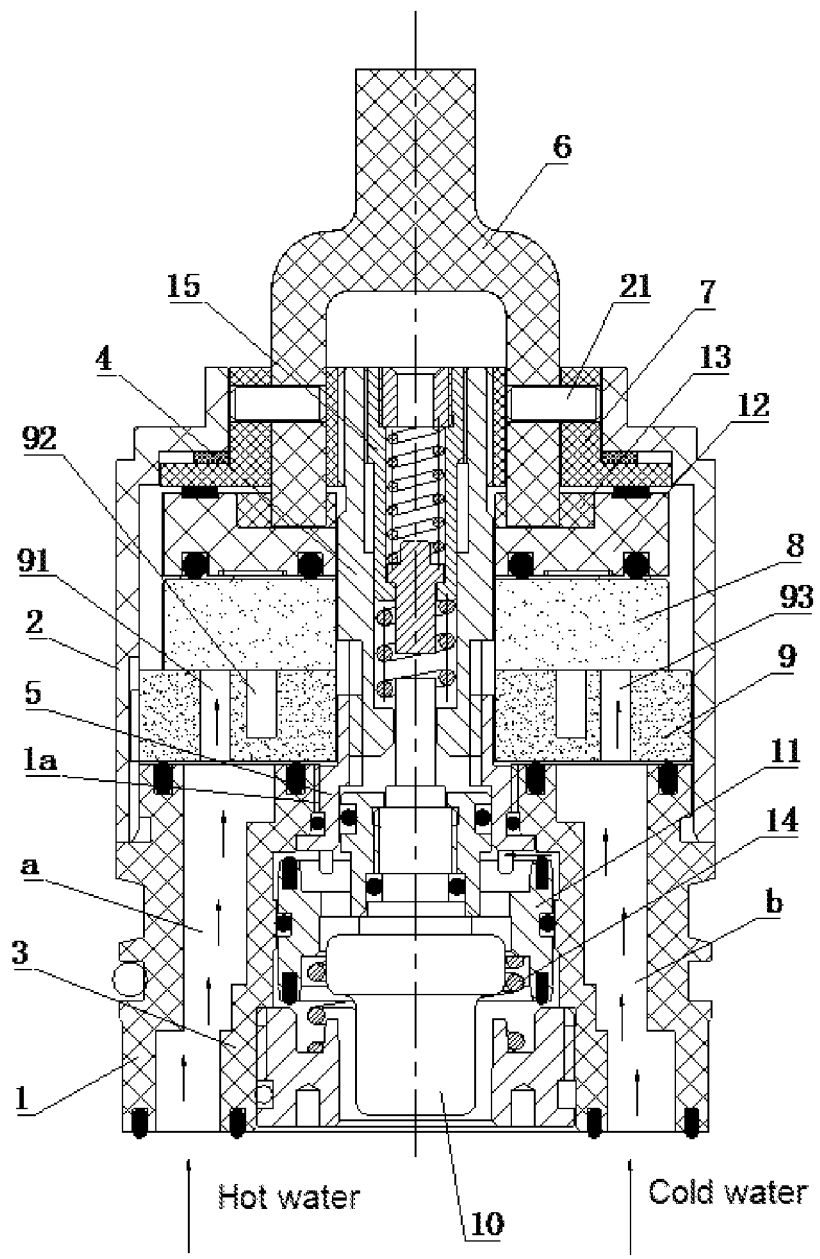
FIG. 16 is a structural schematic drawing of the second embodiment in the present invention.
Figure 17:
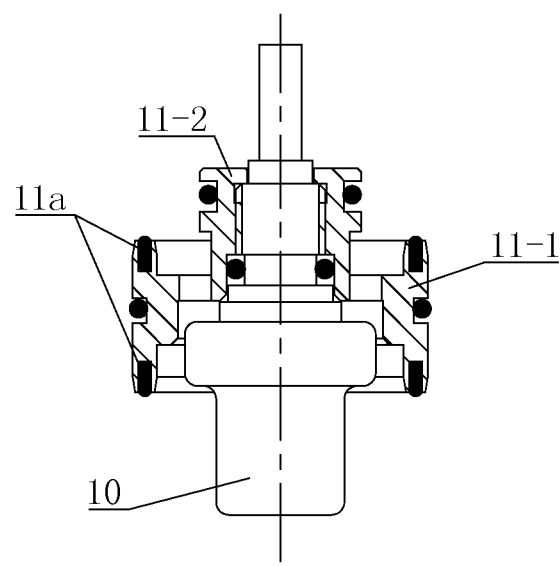
FIG. 17 is an assembly schematic drawing of the regulator and the thermo-sensitive element in the second embodiment.

With reference to FIG. 16 and FIG. 17, the difference between this embodiment and the first embodiment is as follows: In this embodiment, the thermo-sensitive element 10 is thread-connected with the regulator 11 so that the regulator can move along with the thermo-sensitive element. The upper end face of the water control portion 11-1 can be controlled to contact with the internal wall of the vale core body 1 when the regulator 11 moves up to the top, and the lower end face of the water control portion 11-1 can be controlled to contact with the upper end face of the valve seat 3 when the regulator 11 moves down to the bottom. The seal ring 11a is provided between the upper end face of the water control portion 11-1 and the internal walls of the valve core body 1 which contacts with the upper end face of the water control portion and between the lower end face of the water control portion 11-1 and the upper end face of the valve seat 3. In this embodiment, the seal ring 11a is provided on both the upper end face and the lower end face of the water control portion 11-1, since there is a gap between the seal ring 11a, the internal wall of valve core body and the upper end face of the seat, the hot water and the cold water can flow into the regulator.

The seal ring 11a is provided between the upper end face of the water control portion 11-1 and the internal wall of valve core body 1 and between the lower end face of water control portion 11-1 and the upper end face of the valve seat 3, and the seal ring is provided on the upper end face or the lower end face of the water control portion 11-1 or provided on the internal wall of valve core body 1 or the upper end face of valve seat 3. When the hot water is interrupted and the cold water is available only, the sensor of the thermo-sensitive element 10 can sense the temperature of cold water, so that the push rod contracts to drive the thermo-sensitive element 10 to move upwards and the regulator 11 connected with the thermo-sensitive element 10 moves also upwards to the top accordingly, thus the upper end face of the water control portion 11-1 contacts with the internal wall of the valve core body 1 and the seal ring 11a shuts off the channel for the cold water flowing into the regulator 11 to interrupt the cold water supply. When the cold water is interrupted and the hot water is available only, the sensor of the thermo-sensitive element 10 senses the temperature of hot water, so that the push rod extends to drive the thermo-sensitive element to move downwards and the regulator 11 connected with the thermo-sensitive element 10 moves also down to the bottom accordingly, thus the lower end face of the water control portion 11-1 contacts with the upper end face of the valve seat 3 and the seal ring 11a shuts off the channel for the hot water flowing into the regulator 11 to interrupt the hot water supply, ensuring two-way safety in case of emergent extreme temperature.

The Third Embodiment

Figure 18:
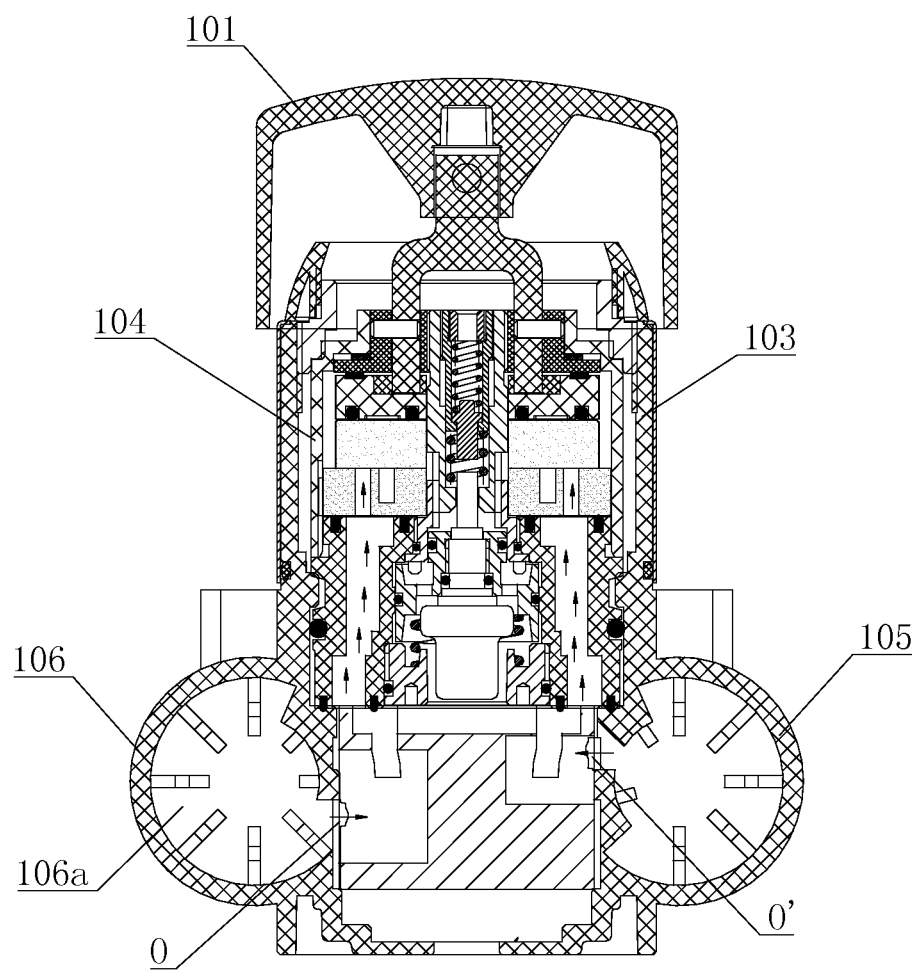
FIG. 18 is a longitudinal sectional view of the faucet in the third embodiment in the present invention.
Figure 19:
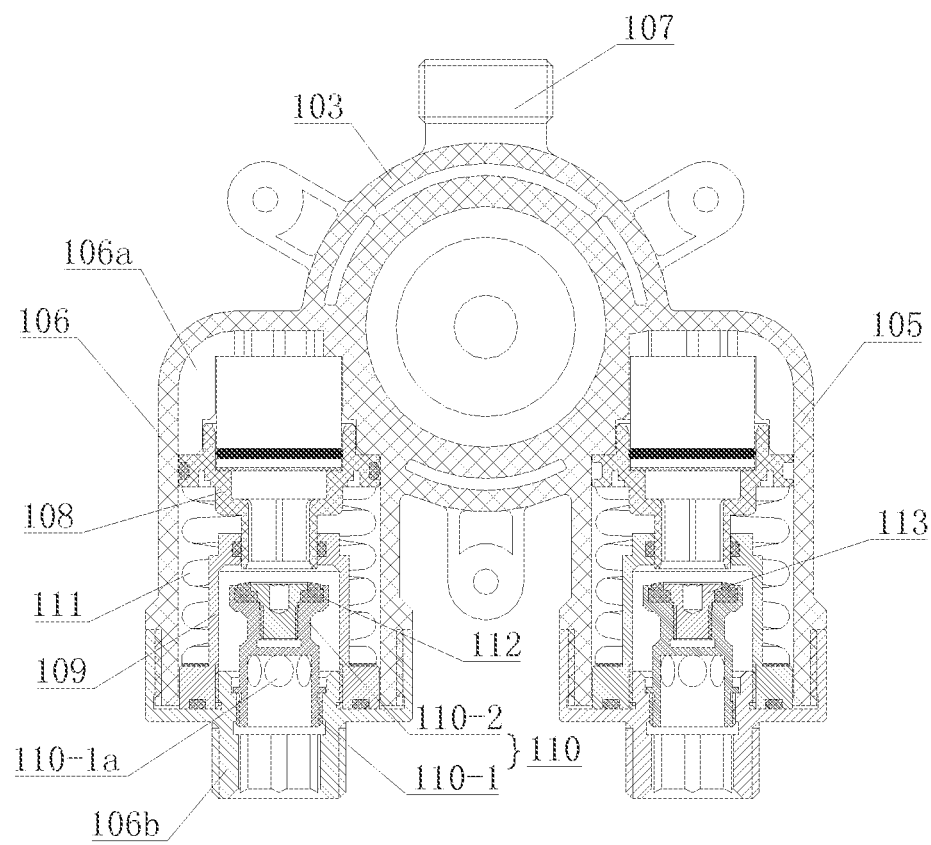
FIG. 19 is a lateral sectional view of the faucet in the third embodiment in the present invention.

With reference to FIG. 18 and FIG. 19, the structural schematic drawings of the faucet applying the thermostatic valve in the first embodiment. In this embodiment, the single-handle dual-control thermostatic faucet comprises a handle 101, a faucet shell 103, a thermostatic valve 104, a cold water incoming pipe 105, a hot water incoming pipe 106 and a mixed outgoing water pipe 107. Wherein, the cold water incoming pipe 105, the hot water incoming pipe 106 and the mixed outgoing water pipe 107 are connected with the faucet shell 103. The thermostatic valve 104 is mounted inside the faucet shell 103 and the handle 101 is connected with the drive lever of the thermostatic valve 104 so that the faucet's switching on/off can be controlled when the handle swings upwards and downwards or rotates to drive the drive lever to move. After flowing into the faucet shell 103 through the cold water incoming pipe 105, the cold water flows into the thermostatic valve through the hot water incoming channel of the valve core body. After flowing into the faucet shell body 103 through the hot water incoming pipe 106, the hot water flows into the thermostatic valve through the cold water incoming channel of the valve core body. The mixed water regulated by the thermostatic vale 104 flows out of the mixed water outgoing pipe 107 through the mixed water outlet of the valve core body.

The water channel can be opened and shut off when the drive lever drives the dynamic ceramic chip to move. When the drive lever drives the drive plate to rotate, the temperature regulating valve stem moves upwards or downwards further to drive the regulator move upwards or downwards accordingly so that the opening degrees of both the cold water inlet and hot water inlet of the valve core are changed, the ratio of the cold incoming water to the hot incoming water is changed and the temperature of the mixed water is changed to perform the function of temperature regulation.

In this embodiment, the structure of the cold water incoming pipe 105 is identical to that of the hot water incoming pipe 106. Taking the hot water incoming pipe for example, its structure is described as follows:

A control cavity 106a is formed inside the hot water incoming pipe 106, and the front end of the hot water incoming pipe 106 comprises a connection portion 106b of the water incoming pipe. For the sake of clarity, the end for the incoming water of the hot water incoming pipe 106 (control cavity) is defined as the water incoming end and another end opposite to the water incoming end, that is, the end for the outgoing water of the hot water incoming pipe 106 (control cavity) is defined as the water outgoing end. A piston part 108, a guiding part 109, a sealing pad support 110, a displacement elastomer 111 and a sealing pad 112 are provided inside the control cavity 106a of the hot water incoming pipe 106. The guiding part 109 is a hollow pipe body which is fixed inside the control cavity 106a and located at the water incoming end of the hot water incoming pipe 106 and is connected with the water inlet of the hot water incoming pipe 106 (control cavity). A piston part 108 is provided between the internal wall of the water outgoing end inside the hot water incoming pipe 106 and the guiding part 109. The piston part 108 is a hollow body also.

Figure 20:
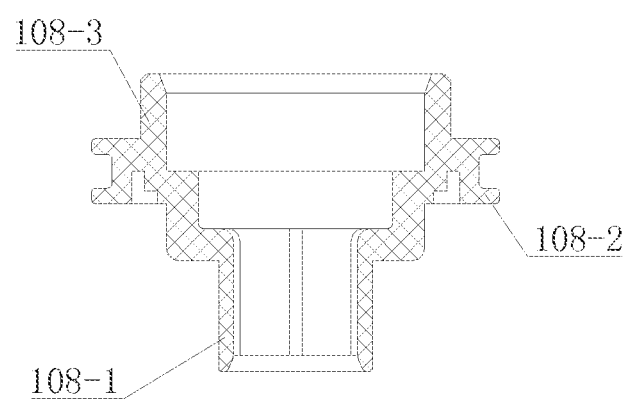
FIG. 20 is a structural schematic drawing of the piston part in the third embodiment in the present invention.

With reference to FIG. 20, the piston part 108 includes a water drawing portion 108-1, an elastomer action portion 108-2 and a contact portion 108-3. A seal ring is provided for sealing between the outer edge of the elastomer action portion 108-2 and the internal wall of the control cavity 106a to divide the internal part of hot water incoming pipe 106 into a water incoming zone and a water outgoing zone. The water drawing portion 108-1 extends into the internal cavity of the guiding part 109, a seal ring is provided for sealing between the outer edge of the water drawing portion 108-1 and the internal wall of guiding part 109, and the internal cavity of the piston part 108 is connected with the internal cavity of the guiding part 109. The contact portion 108-3 is against the internal wall of the water outgoing end of the hot water incoming pipe 106 (control cavity) or against the contact portion provided on the internal wall. A displacement elastomer 111 is provided between the elastomer action portion 108-2 of the piston part 108 and the guiding part 109. One end of the displacement elastomer 111 is against the elastomer action portion 108-2 and another end is against the guiding part 109 or against the internal wall of the control cavity 106a.

In this embodiment, the sealing pad support 110 is provided inside the guiding part 109. As a installation portion for the sealing pad, the sealing pad support 110 in this embodiment is fixed to the connecting portion 106b of the water incoming pipe. The sealing pad support 110 consists of a water discharge portion 110-1 and a supporting portion 110-2 disposed on the water discharge portion 110-1. Water discharge hole 110-1a drilled on the upper peripheral wall of the water discharge portion 110-1 whose position can be adjusted according to the installation position of the sealing pad support. The water discharge portion 110-1 is connected with the water inlet of the hot water incoming pipe 106. After flowing into the hot water incoming pipe 106, the hot water flows into the water discharge portion 110-1 and flows from the water discharge hole 110-1a into the internal cavity of the guiding part 109. The supporting portion 110-2 is integrally connected with the top of the water discharge portion 110-1, and the sealing pad 112 is provided on the end face of the supporting portion 110-2 by the top cap 113 and located at the water incoming side of the water discharge portion. The sealing pad 112 can change (open or shut off) the water route between the guiding part and the piston part.

After flowing into the internal cavity of the guiding part 109 through the water discharge hole 110-1a of the water discharge portion 110-1, the hot water flows into the internal cavity of the piston part 108 through the water drawing portion 108-1 of the piston part 108, then flows into the water outgoing zone of the hot water incoming pipe and flows finally into the thermostatic valve from the water outgoing end of the hot water incoming pipe 106 through the hot water inlet 0. (Similarly, the cold water can flow into the thermostatic valve from the water outgoing end of the cold water incoming pipe 105 through the cold water inlet 0'). The water pressure acting on the water outgoing end (that is, the water incoming end of the thermostatic valve) can pressurize on the contact portion 108-3 of the piston part 108 and the displacement elastomer 111 can also act on the elastomer action portion 108-3 of the piston part 108. By the action of the water pressure and elastic force, the piston part 108 can move axially inside the control cavity 106a so as to change the distance (water route) between the water incoming end of the water drawing portion 108-1 of the piston part 108 and the sealing pad 112. The flow of incoming water becomes less when the drawing portion 108-1 is near the sealing pad 112, and the flow of incoming water becomes more when the water drawing portion 108-1 is far from the sealing pad 112. When the water incoming pressure of the water incoming end of the thermostatic valve increases, the water outgoing pressure of the water outgoing end of the hot water incoming pipe 106 become larger accordingly, the water pressure acts on the contact portion 108-3 of the piston part 108 to move the piston part 108 axially downwards. The cross-sectional area of the water route becomes smaller between the water incoming end of the water-drawing portion 108-1 of the piston part 108 and the sealing pad 112, the water resistance becomes larger and the flow of incoming water becomes less consequently so as to decrease the water outgoing pressure of the water outgoing end, and further, to limit the water incoming pressure into the thermostatic valve and to enhance the high pressure-resistant performance of the faucet to enhance the constant temperature/pressure performance of the faucet.

The Fourth Embodiment

Figure 21:
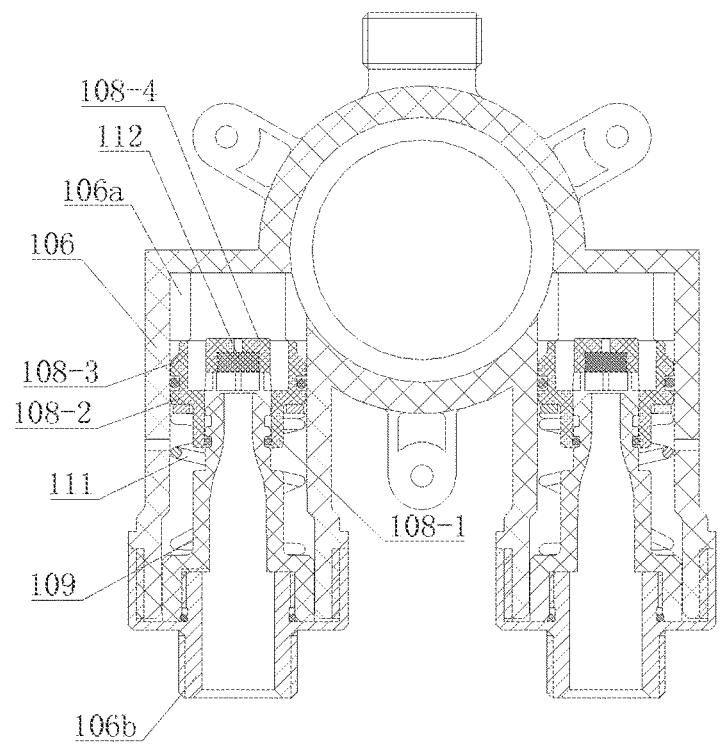
FIG. 21 is a structural schematic drawing of the faucet in the fourth embodiment in the present invention.

As shown in FIG. 21, the difference between this embodiment and the third embodiment is: No support for the sealing pad is provided in this embodiment. The guiding part 109 is fixed inside the hot water incoming pipe and is connected with the water inlet of the hot water incoming pipe 106. The upper end of the guiding part 109 extends into the water drawing portion 108-1 of the piston part 108, and a sealing ring is provided between the outer edge of the upper end of the guiding part 109 and the internal wall of the water drawing portion 108-1. The internal cavity of the piston part 108 is connected with that of the guiding part 109. A sealing ring is provided between the outer edge of the elastomer action portion 108-2 and the internal wall of the control cavity 106a, and the contact portion 108-3 is against the internal wall of the water outgoing end of the hot water incoming pipe 106. A displacement elastomer 111 is provided between the elastomer action portion 108-2 of the piston part 108 and the guiding part 109, and one end of the displacement elastomer 111 is against the elastomer action portion 108-2 and other end is against the flange at bottom of the guiding part 109. A sealing pad installation portion 108-4 is provided inside the contact portion 108-3, and the sealing pad installation portion is integrally connected with the contact portion. The sealing pad 112 is provided on the bottom surface of the sealing pad installation portion 108-4 and is located at the water outgoing side of the guiding part. When the piston part 108 moves axially, the distance between the water outgoing end of the guiding part 109 and the sealing pad 112 will change, so as to change the incoming water flow and regulate the water incoming pressure into the valve core.

The Fifth Embodiment

Figure 22:
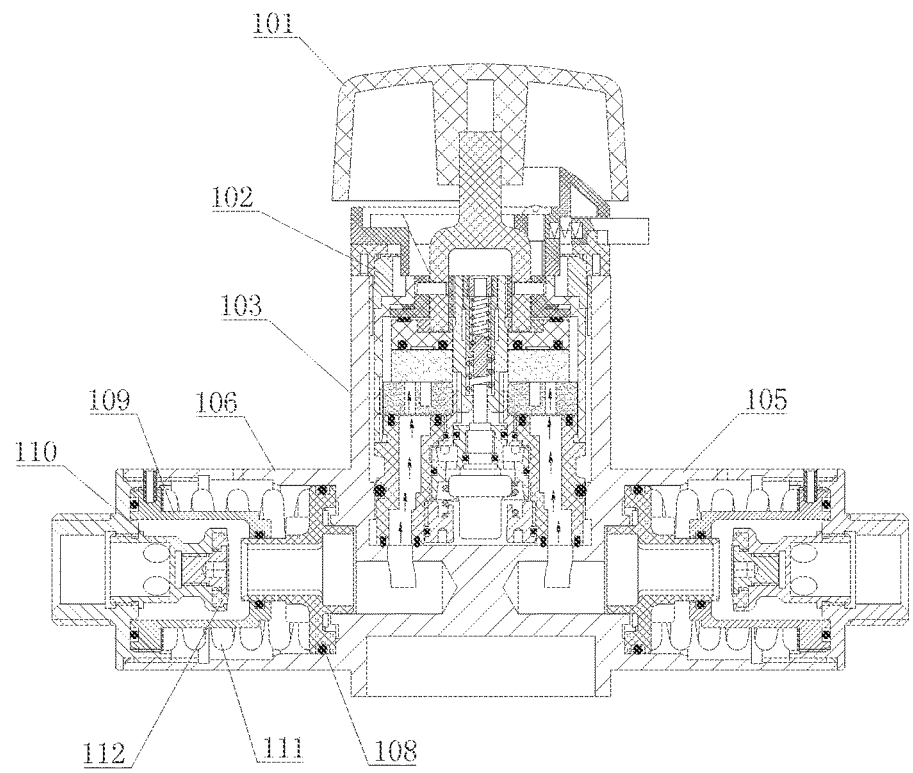
FIG. 22 is a structural schematic drawing of the faucet in the fifth embodiment in the present invention.

As is shown in FIG. 22, the difference between this embodiment and the third embodiment is: The water incoming direction of the cold/hot water inlet of the faucet in the third embodiment is parallel with the direction of the mixed water outlet, and the water incoming direction of the cold/hot water inlet is perpendicular to the direction of the mixed water outlet in this embodiment.

The Sixth Embodiment

Figure 23:
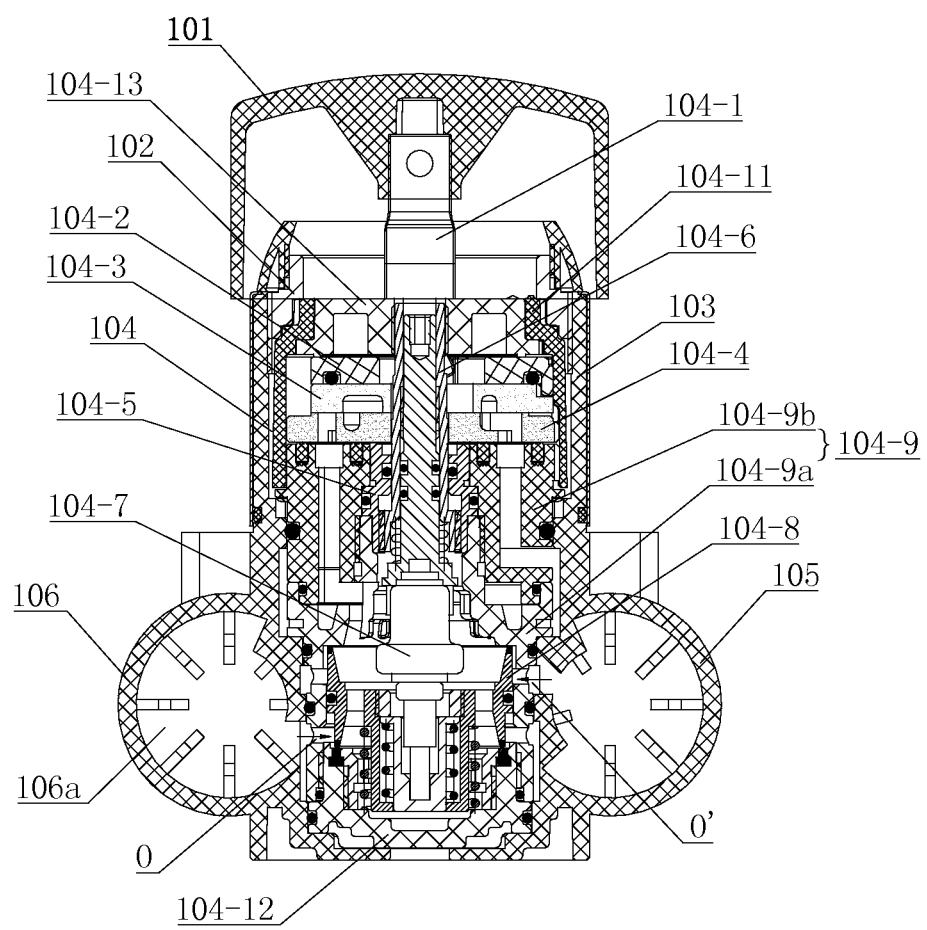
FIG. 23 is a structural schematic drawing of the faucet in the sixth embodiment in the present invention.

With reference to FIG. 23, the single-handle dual-control thermostatic faucet in this embodiment comprises a handle 101, a gland nut 102, a faucet shell 103, a thermostatic valve 104, a cold water incoming pipe 105, a hot water incoming pipe 106 and a mixed water outgoing pipe 107. The difference between this embodiment and the third embodiment is: The structure of the thermostatic valve 104 in this embodiment is identical to that of the thermostatic valve in the Application for a Patent Publication in China with Publication No. CN 103912693A proposed by the Applicant on Feb. 28, 2014, and the thermostatic valve 104 comprises a driving lever 104-1, a drive plate 104-2, a dynamic ceramic chip 104-3, a static ceramic chip 104-4, a temperature regulating valve stem seat 104-5, a temperature regulating valve stem 104-6, a thermo-sensitive element 104-7, a regulator 104-8, a valve core body 104-9, a valve jacket 104-11, a seat 104-12 and a driving lever seat 104-13. The valve core body 104-9 in this embodiment includes a valve core body 104-9a and valve core jacket 104-9b which hermetically-fits with the valve core body 104-9a through a seal ring. The valve jacket 104-11 is connected with the top of the valve core body 104-9, the seat 104-12 is provided in the bottom of the valve core body 104-9. The seat 104-12 and the valve core body 104-9 form a space for accommodating the temperature regulating part and a water mixing zone. The dynamic ceramic chip 104-3 and the static ceramic chip 104-4 are provided inside the valve jacket 104-11, the latter is provided above the valve core body 104-9, the former is provided on the static ceramic chip 104-4. A hot water inlet passage, a hot water outlet passage a cold water inlet passage and a cold water outlet passage are provided separately on the static ceramic chip, and a hot water cavity and a cold water cavity are provided on the dynamic ceramic chip respectively. The hot water inlet passage, a hot water outlet passage a cold water inlet passage and a cold water outlet passage can be connected or shut off when the dynamic ceramic chip rotates.

The handle 101 is connected with the driving lever 104-1 which is connected with the drive plate 104-2 through a pin roll. The driving lever 104-1 drives the dynamic ceramic chip 104-3 move though the drive plate 104-2. Along with upward and downward swing of the handle 101, the driving lever 104-1 is driven to move, and further, to drive the dynamic ceramic chip 104-3 move for open and shut-off of the water channel. The upper end of the thermo-sensitive element 104-7 is against the end of the temperature regulating valve stem 104-6 and its lower end is indirectly against the regulator 104-8 by a spring. The thermo-sensitive element is connected with the regulator, when the thermo-sensitive element is moving, the regulator can be driven to move synchronously. With the change in the mixed water temperature in the water mixing zone, the push rod of the thermo-sensitive element 104-7 can extend and contract accordingly so as to drive the regulator 104-8 to move upwards and downwards to further regulate the cold/hot water flow to obtain a balanced ratio of the cold/hot incoming water and to keep a stable temperature of the mixed water. The upper external wall of the temperature regulating valve stem 104-6 is connected through teeth with the drive plate 104-2, and the lower part thread-fits with the temperature regulating valve stem seat 104-5. When the handle 101 rotates, the drive lever 104-1 is driven to rotate so as to drive the drive plate 104-2 to rotate, the temperature regulating valve stem 104-6 moves upwards and downwards and further to drive the regulator 104-8 to move upwards and downwards so that the opening degree of both the cold water inlet and hot water inlet of the valve core changes, the ratio of the cold incoming water to the hot incoming water changes and the temperature of the mixed water changes for proper function of temperature regulation.

The supporting portion of the regulator in this embodiment is indirectly against the seat, a seal ring is provided on both the upper end face and lower end face respectively of the water control portion of the regulator. When the regulator moves upwards to the upper end face of its water control portion to contact with the internal wall of the valve core body, the seal ring will close the gap between the both; when the regulator downwards to the lower end face of its water control portion to contact with the upper end face of the seat, the seal ring will close the gap between the both.

In this Specification, each section is described in a progressive way, the difference with other sections is emphasized in each section; for those similar or identical parts, each section can be referred to one another. The combinational relationship among those components/parts is not limited only to the pattern known from the embodiments, and those skilled in the arts can materialize or use the present invention according to the above description of the embodiments known to the public. It will be obvious for those skilled in the art to modify those embodiments for many times. The general principles defined in this Specification can be materialized in other embodiments without departing from the spirits or scope of the present invention. The present invention, therefore, will not be limited to the embodiments shown in this Specification and will extend to the widest range conforming to the principles and the novelty in this Specification known to the public.

What is claimed is:

1. A single-handle dual-control thermostatic valve comprises
    a valve core body;
    a valve jacket hermetically-connected with an upper part of the valve core body; and
    a valve seat located at a bottom of the valve core body, wherein the valve core body and the valve seat form a space for accommodating a temperature regulating part and a water mixing zone;
    a flow part and a control part having a driver lever are provided in the valve jacket, while an upper end of the driving lever of the control part extends upwards out of the valve jacket; and
    the single-handle dual-control thermostatic valve is further characterized in that:
    a hot water incoming channel, a cold water incoming channel, a hot water outgoing channel and a cold water outgoing channel are provided separately in the valve core body, and the hot water incoming channel and the cold water incoming channel penetrate through the valve core body;
    the valve core body has a hot water inlet which connects with the hot water outgoing channel and the water mixing zone and a cold water inlet which connects with the cold water outgoing channel and the water mixing zone, and the hot water inlet and the cold water inlet are located at the positions with different heights in the valve core body;
    a static ceramic chip having a hot water inlet passage, a hot water outlet passage, a cold water inlet passage and a cold water outlet passage is provided above the valve core body in the valve jacket, a dynamic ceramic chip having a hot water controlling channel and a cold water controlling channel is provided on the static ceramic chip, the dynamic ceramic chip is connected with the control part and can rotate and translate by the control part, wherein the hot water inlet passage, the hot water outlet passage, the cold water inlet passage and the cold water outlet passage are connected correspondingly with the hot water incoming channel, the hot water outgoing channel, the cold water incoming channel and the cold water outgoing channel of the valve core body respectively, the hot water controlling channel can open or shut off both the hot water inlet passage and the hot water outlet passage on the static ceramic chip, and the cold water controlling channel can open or shut off both the cold water inlet passage and the cold water outlet passage on the static ceramic chip; and
    a mixed water outlet is located on the valve seat and connected with the water mixing zone.

2. A single-handle dual-control thermostatic valve according to claim 1, characterized in that:
    the temperature regulating part comprises a temperature regulating valve stem, a temperature regulating valve stem seat, a thermo-sensitive element, a regulator and a return spring, wherein a hole for the temperature regulating valve stem is provided at the top of the valve core body and the temperature regulating valve stem seat is fixed to the internal wall of the temperature regulating valve stem hole, the temperature regulating valve stem thread-fits with the temperature regulating valve stem seat and its upper end extends upwards;
    the regulator including a water control portion and a supporting portion is provided between the temperature regulating stem seat and the valve seat, and the external peripheral wall of the water control portion is against the internal wall of the valve core body and the supporting portion is against the bottom of the temperature-regulating valve stem seat, the upper end and lower end of the water control portion are located at the hot water inlet and the cold water inlet of the valve core body respectively; and
    a cold/hot isolation seal ring between the hot water inlet and the cold water inlet is provided on the external peripheral wall of the water control portion, the upper end of the thermo-sensitive element is indirectly against the valve stem by a locking spring and its lower end is indirectly against the valve seat by a return spring, the lower end and upper end of the return spring is against the valve seat and the regulator respectively.

3. A single-handle dual-control thermostatic valve according to claim 2, characterized in that:
the thermo-sensitive element is connected with the regulator to drive the latter move;
a seal ring is provided between the upper end face of the water control portion of the regulator and the internal wall of the valve core body and between the lower end face of the water control portion and the upper end face of the valve seat, when the upper end face of the water control portion contacts with the internal wall of the valve core body, the seal ring closes the gap between the upper end face of the water control portion and the internal wall of the valve core body; and
when the lower end face of the water control portion contacts with the upper end face of the valve seat, the seal ring closes the gap between the lower end face of the water control portion and the upper end face of the valve seat.

4. A single-handle dual-control thermostatic valve according to claim 3, characterized in that the seal ring is disposed on the upper end face and the lower end face of the water control portion.

5. A single-handle dual-control thermostatic valve according to claim 1, characterized in that:
the control part comprises a driving lever, a driving lever seat, a drive plate and the drive plate's driver, the driving lever seat and the drive plate are accommodated on the upper part of the internal cavity in the valve jacket, and the drive plate is located below the driving lever seat and connected with the dynamic ceramic chip, the outer teeth at the upper end of the temperature regulating valve stem fits with the inner teeth in the center hole of the driving lever seat, the lower part of the driving lever penetrates through the driving lever seat and is connected with the lever seat by a dowel, the lower end of the driving lever is embedded into and fixed to the driving lever driver on the drive plate.

6. A single-handle dual-control thermostatic valve according to claim 1, characterized in that:
the hot water inlet passage of the static ceramic chip is located outside of the hot water outlet passage and is longer than the latter; and
the cold water inlet passage is located outside of the cold water outlet passage and is longer than the latter.

7. A single-handle dual-control thermostatic valve according to claim 1 or 6, characterized in that:
the water incoming end face of the hot water incoming channel and that of the cold water incoming channel are located on the bottom surface of the valve core body and are arc-shaped, the water outgoing end face of the hot water incoming channel, that of the cold water incoming channel, the water incoming end face of the hot water outgoing channel and that of the cold water outgoing channel are located on the top surface of the valve core body and are sector-shaped; and
the water outgoing end face of the hot water incoming channel, that of the cold water incoming channel, the water incoming end face of the hot water outgoing channel and that of the cold water outgoing channel are identical in shape and size and evenly distributed along the circumference with a certain interval.

8. A single-handle dual-control thermostatic valve according to claim 7, characterized in that the water outgoing end face of the hot water incoming channel deflects 10-30° relatively to axis X.

9. A single-handle dual-control thermostatic valve according to claim 8, characterized in that the included angle between the edge of the hot water outgoing channel and the axis X is 5-15° and that between the edge of the cold water outgoing channel and the axis X is 40-50°.

10. A single-handle dual-control thermostatic faucet provided with a single-handle dual-control thermostatic valve according to any article of claim 1, characterized in that the single-handle dual-control thermostatic faucet comprises a faucet shell, a thermostatic valve provided in the faucet shell, a handle which controls the thermostatic valve, a cold water incoming pipe, a hot water incoming pipe and a mixed water outgoing pipe which are connected with the faucet shell, the handle is connected with the driving lever of the thermostatic valve.

11. A single-handle dual-control thermostatic faucet according to claim 10, characterized in that:
the cold water incoming pipe and the hot water incoming pipe form an internal control cavity respectively, inside the control cavity;
a hollow guiding part which is connected with the water inlet of the control cavity;
a piston part provided between the guiding part and the water outgoing end of the control cavity;
the internal cavity of the piston part is connected with the internal cavity of the guiding part, and the piston part has a water drawing portion, an elastomer action portion and a contact portion which are connected with one another successively can move axially inside the control cavity, wherein the water drawing portion is embedded into and connected with the guiding part, the contact portion is against the water outlet of the control cavity and a seal ring is provided between the outer edge of the elastomer action portion and the internal wall of the control cavity;
a displacement elastomer provided between the elastomer action portion and the guiding part; and
a sealing pad provided on its installing portion can change the water route between the guiding part and the piston part.

12. A single-handle dual-control thermostatic faucet according to claim 11, characterized in that:
the sealing pad installing portion is a support for the sealing pad provided in the connecting portion of the water incoming pipe, and the sealing pad support comprises a water discharge portion having water discharge holes on its peripheral wall connected with the water inlet of the control cavity and a supporting portion provided on the water discharge portion, and the sealing pad is provided on the end face of the supporting portion; and
the water drawing portion extends into the internal cavity of the guiding part, and the sealing pad is located at the water incoming side of the water drawing portion.

13. A single-handle dual-control thermostatic faucet according to claim 11, characterized in that the upper end of the guiding part extends into the water drawing portion of the piston part, the installing portion for the sealing pad is provided inside the contact portion, and the sealing pad is provided on the bottom surface of the installing portion of the sealing pad and is located at the water outgoing side of the guiding part.

* * * * *